(12) United States Patent
Gao et al.

(10) Patent No.: US 8,998,191 B2
(45) Date of Patent: Apr. 7, 2015

(54) FLEXIBLE SUPPORT ASSEMBLY FOR VEHICLE TOOLING PLATES

(75) Inventors: Dalong Gao, Troy, MI (US); Roland Menassa, Macomb Twp., MI (US)

(73) Assignee: GM Global Technology Operations LLC, Detroit, MI (US)

( * ) Notice: Subject to any disclaimer, the term of this patent is extended or adjusted under 35 U.S.C. 154(b) by 832 days.

(21) Appl. No.: 13/282,535

(22) Filed: Oct. 27, 2011

(65) Prior Publication Data

US 2013/0106042 A1 May 2, 2013

(51) Int. Cl.
*B23Q 3/00* (2006.01)
*B62D 65/02* (2006.01)

(52) U.S. Cl.
CPC ..................... *B62D 65/026* (2013.01)

(58) Field of Classification Search
CPC .............. B25B 1/14; B25B 5/02; B25B 7/14; B25B 11/00; B25B 11/02
USPC ............... 269/311, 309–310, 32, 24–27, 228, 269/289 R
See application file for complete search history.

(56) References Cited

U.S. PATENT DOCUMENTS

| | | | |
|---|---|---|---|
| 5,013,015 A * | 5/1991 | Fatheree .......................... | 269/24 |
| 5,192,058 A * | 3/1993 | VanDalsem et al. ............ | 269/24 |
| 6,059,277 A * | 5/2000 | Sawdon et al. .................. | 269/24 |
| 7,448,607 B2 * | 11/2008 | Steele et al. ..................... | 269/32 |
| 8,292,282 B2 * | 10/2012 | Gao et al. ........................ | 269/311 |
| 8,376,336 B2 * | 2/2013 | McIntosh ......................... | 269/47 |
| 2010/0052233 A1 * | 3/2010 | Karras et al. ..................... | 269/24 |
| 2013/0106042 A1 * | 5/2013 | Gao et al. .................. | 269/289 R |

* cited by examiner

*Primary Examiner* — Lee D Wilson
(74) *Attorney, Agent, or Firm* — Quinn Law Group, PLLC

(57) ABSTRACT

A support pin assembly for supporting and/or locating a fixture on a tooling plate is provided. The support pin assembly includes a stanchion with a bore configured to secure the support pin assembly to a locating surface on the tooling plate. A sleeve is included within the stanchion bore, such that the sleeve is infinitely adjustable between two positions and lockable with respect to the stanchion. The assembly additionally includes a locator pin engaged at a first end thereof with the sleeve, and configured to mate at a second opposing end thereof with the fixture. Furthermore, the assembly includes a stopper pin operatively connected to the sleeve and configured to selectively extend and retract relative to the locator pin. The locator pin is free to displace relative to the locating surface when the stopper pin is retracted and is blocked from displacing when the stopper pin is extended.

20 Claims, 4 Drawing Sheets

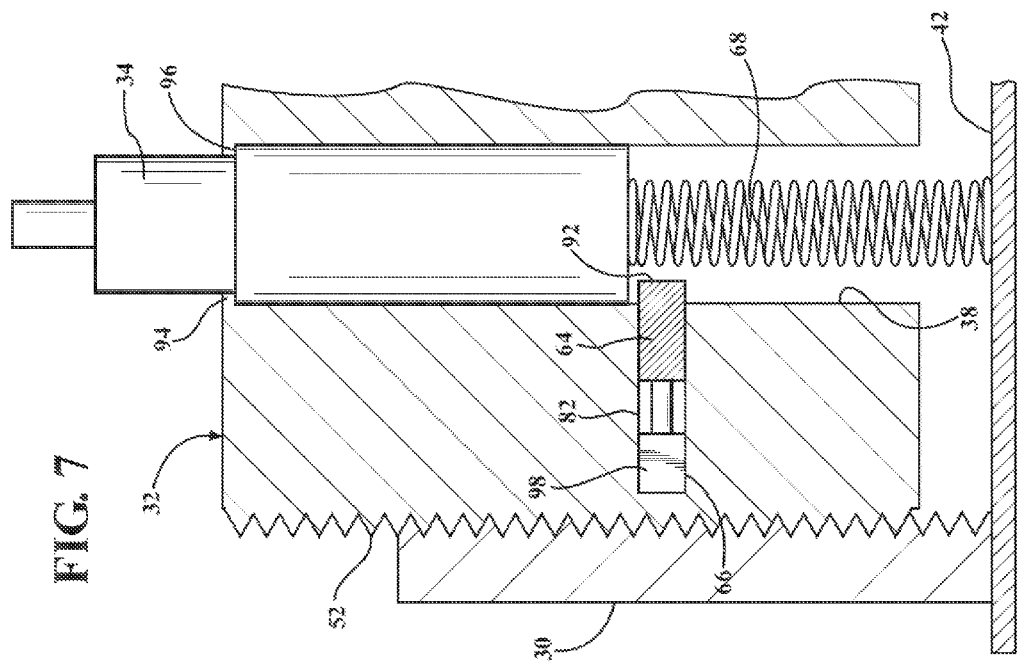
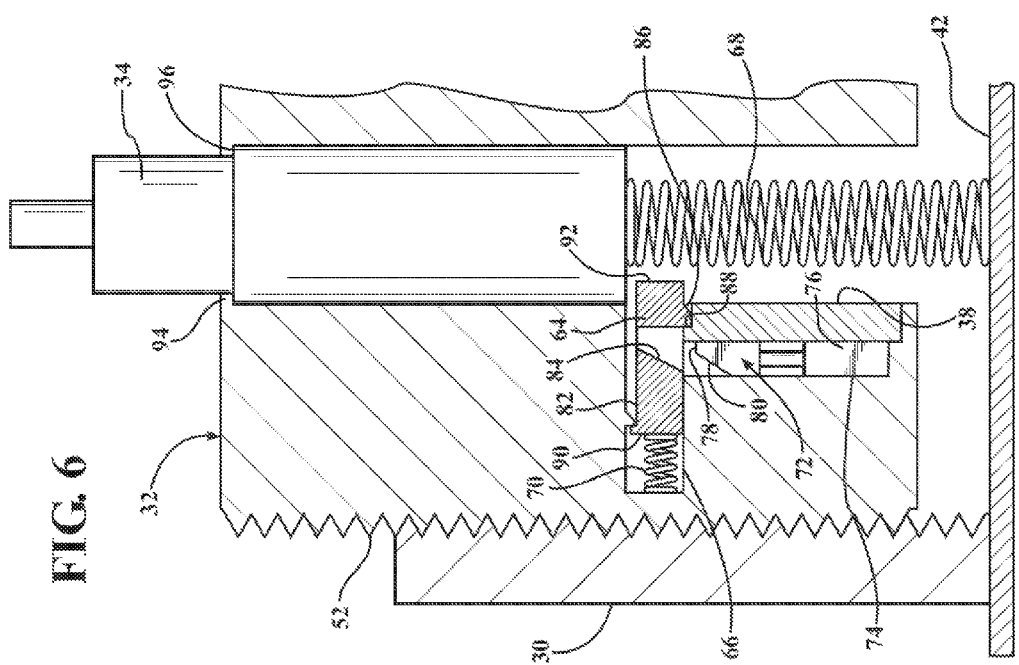

FLEXIBLE SUPPORT ASSEMBLY FOR VEHICLE TOOLING PLATES

TECHNICAL FIELD

The present disclosure relates generally to motor vehicle manufacturing and assembly operations, and more specifically to tooling plate supports used in vehicle body-chassis marriage applications.

BACKGROUND

A contemporary motor vehicle, such as the modern-day automobile, consists of thousands of individual components. It has been, and remains conventional practice in the automotive industry for the vehicle body (or frame) to be built as an open structure into which are fitted and fixed all the constituent parts and equipment of the vehicle. A continuously moving conveyor, which is part of an overall mass production assembly line, carries the vehicle assembly through an assortment of work stations where various parts are fitted to the vehicle assembly to ultimately produce a completed vehicle.

In modern vehicle assembly operations, it is customary to preassemble the individual components of the vehicle chassis, such as the engine, transmission, differential, and suspension, before marrying them with the vehicle frame in a "Body-on-Frame" or "Body Frame Integral" construction. The vehicle frame is typically oriented using an overhead hanger-type conveyor system, whereas the chassis components are supported by a fixture pallet or tooling plate. One or more precision locating and lifting apparatuses operate to arrange the chassis components into position beneath the moving body, and raise the chassis components into position for assembly with the body. Once the locating apparatus lifts the part to an elevated position, it is secured to the vehicle body. In the alternative, the vehicle body may also be lowered on top of the chassis components.

The vehicle body-chassis marriage application generally requires precision location of the constituent parts prior to the actual marrying with the vehicle frame. It may be desirable, for example, to support a particular component in an orientation which corresponds to its in-vehicle orientation, and in a manner which enables access to particular locations, such as bolt holes, used to attach the component to the vehicle. For instance, the vehicle engine or powertrain (e.g., engine plus transmission) may have specific support structures that are used for the purpose of presenting the engine or powertrain to the vehicle body in a manner which facilitates attachment of the engine or powertrain to the vehicle body.

In such applications, a static locating pin assembly may be employed to position and support the fixture (e.g., engine, transmission, differential, transfer case, etc.) to facilitate subsequent installation to the vehicle. Static locating pins are often used in collaboration with a tooling plate that is designed for setting and transporting fixtures and the like. Such plates conventionally include a base having a top surface with a plurality of accurately located slots or bolt holes formed therein. A typical locating pin assembly may include a static pin having a chamfered head, and a shaft that is rigidly attached to a base. The base, in turn, has a flange that is then either press fit or lock-screwed at a precise location along the locating surface of the tooling plate. The chamfered head of the locating pin is intended to locate and engage holes that are formed at pre-specified locations on the fixture to ensure proper orientation and support thereof.

Tooling plates used in high volume production applications are generally style dependent. As such, a change in vehicle configuration often requires a redesign and re-manufacture of the tooling plate. For example, the attachment points of the fixture and/or vehicle may vary within a single platform, or from platform to platform. Each variation may require its own tooling plate layout. Tooling plates are expensive and time consuming to manufacture because the plate material and machining tends to be expensive, and each opening must be very accurately located with relation to the other openings to ensure proper fixture orientation. In a similar respect, prior art support pins are of a fixed length, and thus must be replaced to accommodate new vehicle design specifications.

SUMMARY

A flexible, rapidly deployable, and low-cost support assembly is disclosed herein for use in manufacturing and assembly operations, such as vehicle body-chassis marriage applications in high volume production plants. The height of the support assembly is readily adjustable, both manually and robotically, and the location of the stand can be easily and quickly modified. In addition, the support pin is easily interchangeable to allow for varying heights and pin-head configurations. The present design reduces pre-production lead time, as well as production and maintenance costs by eliminating the need for constructing numerous tooling plates and support assemblies for a single manufacturing line, and increasing the flexibility of the process.

Accordingly, a support pin assembly for supporting and/or locating a fixture on a tooling plate is provided. The support pin assembly includes a stanchion member that is configured to fixedly secure the support pin assembly to the locating surface of the tooling plate at a predetermined location. The stanchion member has a bore that may have an opening formed at one end. A sleeve member is at least partially disposed within the bore, and operable to telescope with respect to the stanchion member between a first position and a second position. The sleeve member is infinitely adjustable to lock in any predetermined position between the first and second positions. The support assembly also includes a locator pin that is engaged at a first end of the pin with the sleeve member, and configured to mate at a second opposing end of the pin with the fixture. Furthermore, the support pin assembly includes a stopper pin operatively connected to the sleeve and configured to selectively extend and retract relative to the locator pin. The locator pin is free to displace relative to the locating surface when the stopper pin is retracted and is blocked from displacing relative to the locating surface when the stopper pin is extended.

The support pin assembly may include a first spring configured to urge the locator pin away from the locating surface.

The support pin assembly may also include a switch pin configured to engage and retract the stopper pin.

The stopper pin may include a latch configured to maintain the stopper pin position when the stopper pin is extended relative to the locator pin.

The support pin assembly may additionally include an actuator disposed relative to the switch pin and configured to retract the stopper pin away from the locator pin.

The support pin assembly may additionally include a second spring disposed relative to the stopper pin and configured to extend the stopper pin relative to the locator pin. In such a case, the stopper pin may include a first end configured to contact the second spring and a second end configured to contact the sleeve member when the stopper pin is extended. Furthermore, the switch pin may engage the stopper pin proximate to the second end of the stopper pin.

The support pin assembly may additionally include an actuator disposed relative to the stopper pin and configured to selectively extend and retract the stopper pin relative to the locator pin.

Furthermore, the support pin assembly may include an actuator configured to selectively extend and retract the stopper pin relative to the locator pin.

Moreover, the support pin assembly may include a locking member configured to mate with and lock the sleeve member in any predetermined position between the first and second positions. Such a locking member may include a nut with a threaded bore defined therethrough.

The above features and advantages, and other features and advantages of the present disclosure, will be readily apparent from the following detailed description of the embodiment(s) and best mode(s) for carrying out the described invention when taken in connection with the accompanying drawings and appended claims.

BRIEF DESCRIPTION OF THE DRAWINGS

FIG. 6 is a fragmented cross-sectional view of one version of the support assembly shown in FIGS. 2-5.

FIG. 7 is a fragmented cross-sectional view of an alternative version of the support assembly shown in FIGS. 2-5.

DETAILED DESCRIPTION

Figure 1:
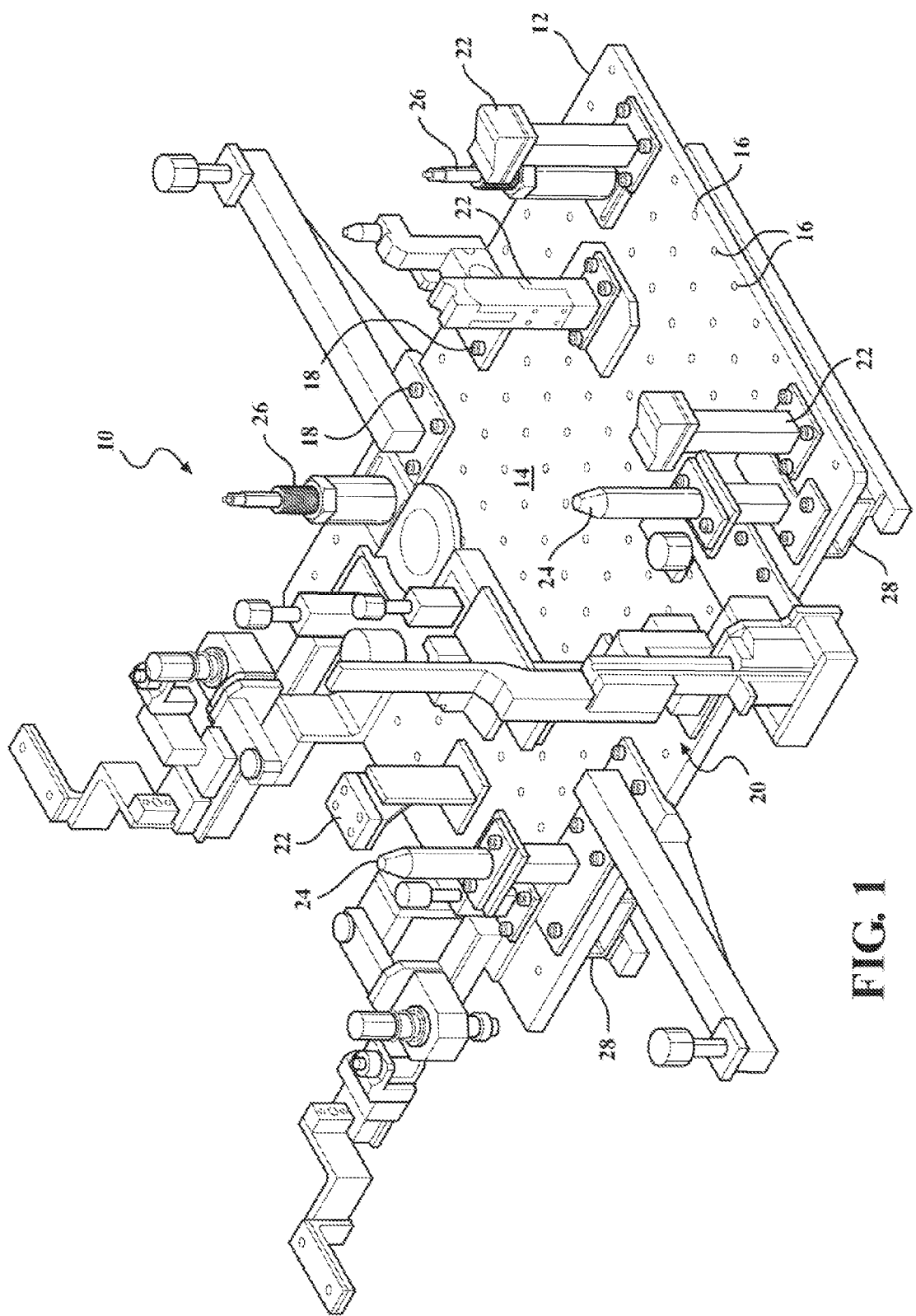
FIG. 1 is an elevated isometric illustration of an example tooling plate assembly having a plurality of support assemblies in accordance with the present disclosure mounted thereto.

Referring to the drawings, wherein like reference numbers refer to like components throughout the several views, a representative tooling plate assembly with which the present invention may be incorporated and practiced is shown in FIG. 1, and is identified generally as 10. The tooling plate assembly 10 is intended for use in body-chassis marriage applications in a high volume, flexible manufacturing automobile production plant. It should be readily understood, however, that the present invention may be employed in other manufacturing and assembly operations in the automotive industry, as well as other industries. Moreover, the particular arrangement shown in FIG. 1 is merely provided for exemplary purposes. As such, the present invention is by no means limited to the particular tooling plate configuration shown in the drawings. Finally, the drawings presented herein are not to scale and are provided purely for instructional purposes. Thus, the individual and relative dimensions shown in the drawings are not to be considered limiting.

With continued reference to FIG. 1, the tooling plate assembly 10 includes platform or a planar tooling plate 12 (sometimes called a "tooling tray"). The tooling plate 12 is fabricated from a material sufficient to support a fixture or workpiece, such as an internal combustion engine, power transmission, differential, transfer case, etc. (not shown), of an automobile thereon, which includes, but is not limited to, cold rolled steel, electro-galvanized steel, hot-dip galvanized steel, tin free steel, and tin mill black plate steel. The tooling plate 12 has a locating surface 14 on one side thereof, and a plurality of fastening holes 16 accurately formed (e.g., through drilling or tapping) at preselected locations of the locating surface 14. It should be readily recognized that the number, orientation, size, and geometry of the fastening holes 16 may be infinitely varied without departing from the intended scope of the present invention. A pair of U-beams 28 is welded to the rear face of the tooling plate 12 at opposing ends thereof to provide reinforcement, and a means of operatively engaging the tooling plate assembly 10 with a precision locating and lifting apparatus (not illustrated herein).

Each fastening hole 16 is designed, with threads or otherwise, to receive a respective fastening element, such as bolts 18, to connect the base plates of various fixture tools to the tooling plate 12. The fixture tools are represented herein by, but certainly not restricted to, a sword package, generally indicated at 20, an array of engine mounts 22, a pair of locating pins 24, and a pair of support assemblies 26 (also referred to herein as "support pin assembly") in accordance with the present invention. The number and location of the fixture tools is determined by the design and type of the component(s) to be supported by the tooling plate assembly 10.

Figure 5:
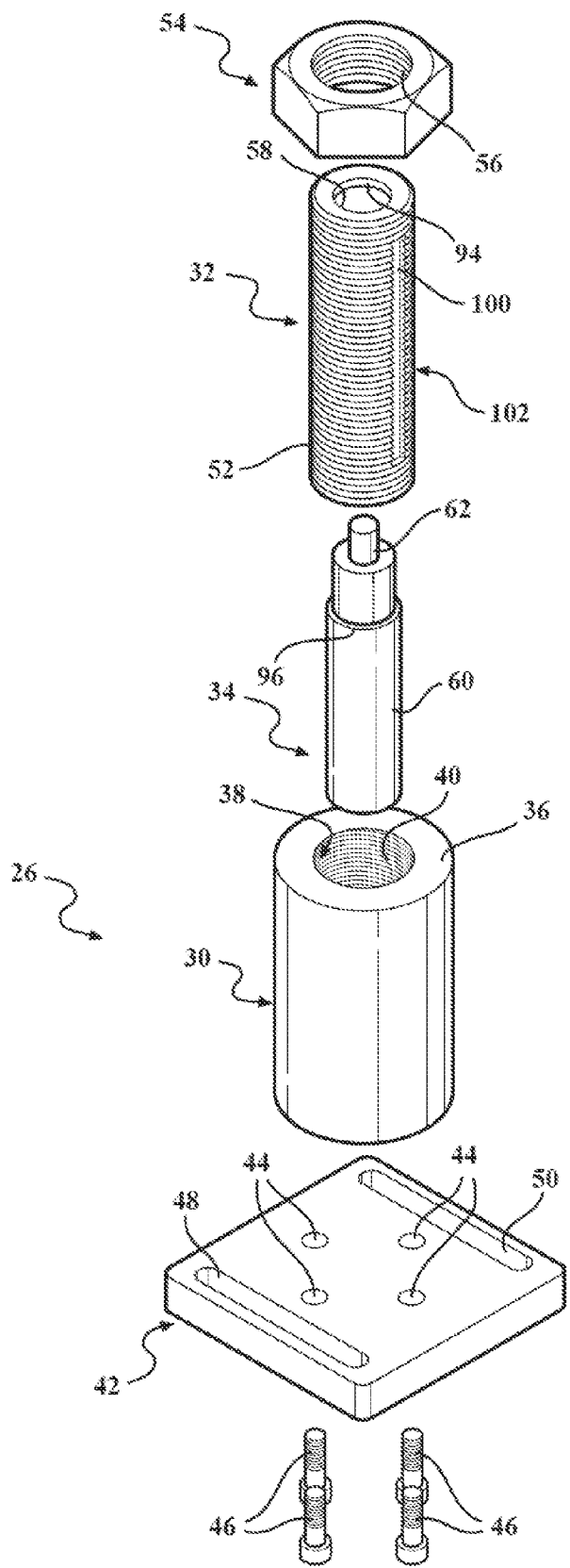
FIG. 5 is an exploded perspective-view illustration of the support assembly shown in FIGS. 2-4.

Turning now to FIG. 5, an exploded, perspective-view illustration of a single support assembly 26 from FIG. 1 is shown. Each of the support assemblies 26 includes a stanchion 30, a sleeve 32, and a removable and replaceable locator pin 34. The stanchion 30 is shown with a cylindrical stanchion body 36 that defines a substantially cylindrical bore 38 extending longitudinally therein, and having an opening at one end thereof. The bore 38 may also be configured as a through hole defined by the body 36. The bore 38 has a first threaded portion 40 which extends longitudinally on an inner-diameter surface thereof (i.e., along the wall of the bore 38). Notably, the shape of the stanchion body 36 is not limited to that of a cylinder, but is shown as such for ease of manufacture and overall simplicity of design.

A generally planar and square base plate 42 is attached to the stanchion body 36 at the end opposite of the bore opening. According to the embodiment of FIG. 5, the base plate 42 includes a number of counter-sunk bolt holes 44 that extend therethrough, each of which may receive a threaded bolt 46 in a flush-fit manner. The bolt 46, once received by a respective bolt hole 44, passes through the base plate 42 to threadably engage threaded apertures (not visible in this view) in the bottom of the stanchion body 36. It is considered within the scope and spirit of the present invention that the base plate 42 may take on additional shapes and dimensions. Furthermore, attachment of the base plate 42 to the stanchion 30 may be achieved through other fastening means, such as welding, or, alternatively, fabricating the two elements as a single-piece structure.

The base plate 42 is intended to repositionably fix the stanchion member 30 and, thus, the entire support assembly 26 to the locating surface 14 of the tooling plate 12 at a predetermined location. According to one embodiment of the present invention, the base plate 42 defines first and second laterally spaced and longitudinally elongated channels 48 and 50, respectively, that extend therethrough. Each of the channels 48, 50 is configured to receive one or more bolts 18 (FIG. 1), each of which is adapted to mate with a respective fastening hole 16 whereby the base plate 42 is fixedly secured to the locating surface 14. The first and second channels 48, 50 allow for a certain amount of "play" or clearance to the bolts 18, thereby providing freedom to selectively vary the position and orientation of the support assembly 26 without having to completely detach the assembly 26 from the tooling plate 12. To this regard, the length and orientation of each channel 48, 50 may be modified to allow for a particular amount of play. Finally, the base plate 42 may be omitted from the support pin assembly 26, and the stanchion 30 attached directly to the tooling plate locating surface 14 at a predetermined location if a tighter footprint is required.

Figure 2:
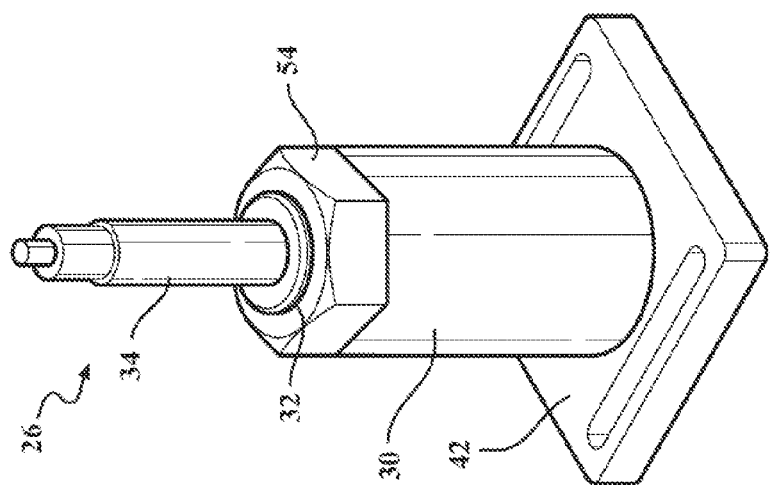
FIG. 2 is an isometric illustration of one of the support assemblies of FIG. 1, depicting a support assembly sleeve and pin locked in a highest position.
Figure 3:
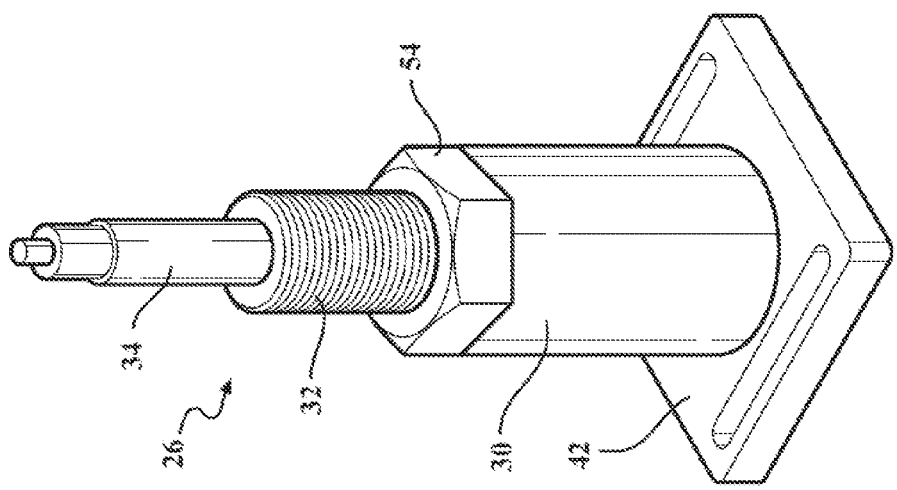
FIG. 3 is an isometric illustration of the support assembly of FIG. 2, depicting the sleeve and pin locked in an intermediate predetermined position.
Figure 4:
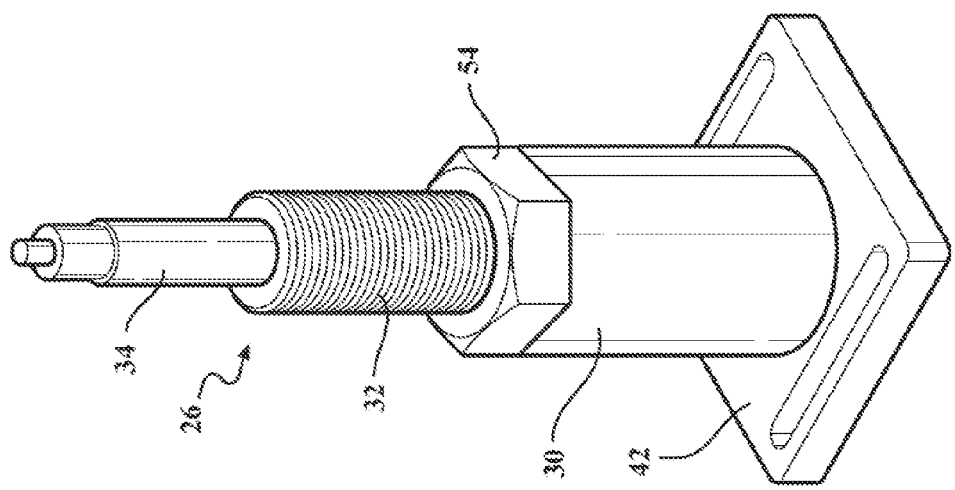
FIG. 4 is an isometric illustration of the support assembly of FIGS. 2 and 3, depicting the sleeve and pin locked in a lowest position.

The cylindrical sleeve 32 is at least partially disposed within the stanchion bore 38, as seen in FIGS. 2-4, and designed to telescope with respect to (i.e., slide in and out of) the stanchion member 30 between a first, highest position, shown in FIG. 2, and a second, lowest position, seen in FIG. 4. In accordance with the present invention, the sleeve 32 is infinitely adjustable to lock at any predetermined position between the first and second positions, one such position shown, for example, in FIG. 3. For example, the sleeve 32 has a second threaded portion 52 on an outer-diameter surface thereof that is threadably engaged with the first threaded portion 40 of the stanchion 30. The threaded interplay between the first and second portions 40, 52 allows the sleeve 32 to axially translate in and out of the bore 38, and provides the necessary interface between the stanchion 30 and sleeve 32 to support a fixture at any point between the first and second positions. The second threaded portion 52 is shown covering the entire outer extent of the sleeve 32. It should be understood, however, that the second threaded portion 52 can cover only certain predetermined segments of the sleeve 32 within the scope of the claimed invention.

Ideally, the support pin assembly 26 also includes a locking member that is operable to lock the sleeve member 32 in position, thereby providing a more resilient engagement between the stanchion 30 and sleeve 32. In one exemplary embodiment, the locking member is a nut 54 with a threaded bore 56 that extends therethrough. By screwing the nut 54 onto the sleeve 32, the threaded bore 56 threadably engages with the second threaded portion 52. Once the sleeve 32 is set to the appropriate height, the nut 54 is tightened so as to press against the flat upper surface of the stanchion 30, and thereby lock the sleeve 32 at any predetermined position (e.g., FIG. 3) between the highest and lowest positions (e.g., FIGS. 2 and 4, respectively).

The sleeve 32 has an axially elongated, blind, i.e., not through, internal slot 58 that is configured to receive the locator pin 34, in a sliding-fit manner. According to an embodiment of the support assembly 26, the locator pin 34 has a substantially cylindrical body 60 that releasably engages with or slots into the blind internal slot 58 of the sleeve member 32 at a first end thereof. The locator pin 34 has a protrusion 62 that projects axially outward from a second opposing end thereof. The protrusion 62 is configured to engage a complementary hole formed in the mating fixture for locating the subject fixture relative to the tooling plate 12. The geometries of the locator pin 34 and slot 58 may be cylindrical for simplifying fabrication of the assembly 26, but may take on additional geometries so long as the locator pin 34 is tightly held within the sleeve member 32.

As shown in FIG. 6, the support assembly 26 also includes a stopper pin 64 operatively connected to the sleeve member 32. The stopper pin 64 is configured to selectively extend and retract relative to the locator pin 34 inside a passage 66. The locator pin 34 is configured to be displaced by a first spring 68 away from the base plate 42 and the locating surface 14 and towards the fixture. The locator pin 34 is free to displace relative to the locating surface 14 when the stopper pin 64 is retracted, and the locator pin is blocked from displacing relative to the locating surface by the stopper pin when the stopper pin is extended. When the locator pin 34 is extended away from the base plate 42 and the locating surface 14, the stopper pin 64 is urged by a second spring 70 to block the travel of the locator pin 34 in the bore 38, and thus retain the locator pin 34 in such position.

The stopper pin 64 may be retracted away from the locator pin 34 by a suitable actuator or manual action to permit the locator pin to be displaced away from the locating surface 14. When the locator pin 34 is thus displaced away from the locating surface 14 and clears the passage 66, the stopper pin 64 is extended by a second spring 70 towards the locator pin to block the travel of the locator pin 34 in the bore 38 in the reverse direction, i.e., toward the locating surface. Accordingly, when the stopper pin 64 is retracted inside the passage 66, the locator pin 34 is free to be displaced relative to the locating surface 14 inside the bore 38. On the other hand, when the stopper pin 64 is extended toward the locator pin 34 and protrudes into the bore 38, the locator pin is limited by the stopper pin in displacement relative to the locating surface 14.

As shown in FIG. 6, a switch pin 72 may be employed to extend and thereby engage and retract the stopper pin 64. The switch pin 72 may be disposed inside a passage 74 and be urged in the direction of the stopper pin 64 by an actuator 76. As shown, the actuator 76 is configured to retract the stopper pin 64 away from the locator pin 34. The switch pin 72 includes a leading end 78 having a first ramp 80 that is configured to engage a pocket 82 having a complementary second ramp 84 inside the stopper pin 64 when the switch pin 72 is extended. During operation, the extension of the switch pin 72 engages the leading end 78 with the pocket 82 and the relative motion of the first ramp 80 with respect to the second ramp 84 retracts the stopper pin 64 away from the locator pin 34 and permits the locator pin to be displaced toward the locating surface 14.

The stopper pin 64 may include a latch 86 configured to maintain position of the stopper pin 64 when the stopper pin is extended relative to the locator pin 34. The latch 86 maintains the extended position of the stopper pin 64 by engaging a notch 88 located on the surface of the bore 38, as shown in FIG. 6. To facilitate disengagement of the latch 86 from the notch 88, the switch pin 72 may lift the stopper pin 64 inside the passage 66. As shown in FIG. 6, the stopper pin 64 includes a first end 90 configured to contact the second spring 70 and a second end 92 configured to contact the sleeve 32 when the stopper pin is extended. In order to assure that the latch 86 is lifted and the stopper pin 64 is consistently and reliably retracted, the pocket 82 may be located in closer proximity to the latch 86 than to the second spring 70. In other words, the switch pin 72 is configured to engage the stopper pin 64 proximate to the second end 92.

As additionally shown in FIGS. 5 and 6, the sleeve 32 includes a ledge or ridge 94, while the locator pin 34 includes a step 96. During extension of the locator pin 34 with respect to the sleeve 32 under the urging of the first spring 68, the step 96 contacts the ridge 94 and fixes the maximum height of the locator pin relative to the locating surface 14. Accordingly, the ridge 94 and the step 94 interact to provide a positive displacement limit for the locator pin 34 and maintain operative connection between the locator pin and the sleeve 32.

As shown in FIG. 7, in the alternative, in place of the second spring 70, the switch pin 72, the latch 86, and the related features, the support assembly 26 may include an actuator 98 disposed relative to the stopper pin 64. In such a case, the stopper pin 64 may be configured without the latch 86. Thus employed, the actuator 98 may be configured to selectively extend and retract the stopper pin 64 on demand relative to the locator pin 34. The actuator 94 may be configured as an externally controlled electromechanical device, such as a solenoid.

To further facilitate ease of setup for the tooling plate assembly 10, the support pin assembly 26 may also include a height indicator that displays the overall height of the assembly 26, i.e., the distance from the bottom of the base plate 42 to the top of the protrusion 62. In one exemplary embodiment, the height indicator is a scale (e.g., a ruler) 100 integral with or attached to the sleeve member. As seen in FIG. 5, an axially elongated substantially flat region 102 is formed into the second threaded portion 52 on the outer-diameter surface of the sleeve 32. The scale 100 is either formed in (e.g., laser etched) or attached (e.g., by adhesives) to the flat region 102.

Overall, the use of the support pin assembly 26 facilitates a highly adjustable tooling plate assembly 10. Additionally, the stopper pin 64 and the related features described above facilitate rapid deployment of the locator pin 34 when the tooling plate assembly 10 is used for various manufacturing and assembly operations. As used herein, "rapid deployment" of the locator pin 34 includes extension of the locator pin to operational height for engagement with the respective complementary hole in the fixture within a substantially small timeframe, such as under one second. Additionally, rapid deployment of the locator pin 34 does not necessitate adjustment of the height of the locator pin at its full extension for the locator pin to be operative.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A support pin assembly for at least one of supporting and locating a fixture on a tooling plate having a locating surface, the support pin assembly comprising:
   a stanchion member configured to fixedly secure the support pin assembly to the locating surface of the tooling plate at a predetermined location, the stanchion member defining a bore;
   a sleeve member at least partially disposed within the bore and configured to telescope with respect to the stanchion member between a first position and a second position, wherein the sleeve member is infinitely adjustable to lock in any predetermined position between the first and second positions;
   a locator pin having a first end and a second opposing end, the locator pin engaged with the sleeve member at the first end and configured to mate with the fixture at the second end; and
   a stopper pin operatively connected to the sleeve member and configured to selectively extend and retract relative to the locator pin;
   wherein the locator pin is free to displace relative to the locating surface when the stopper pin is retracted, and the locator pin is blocked from displacing relative to the locating surface by the stopper pin when the stopper pin is extended.

2. The support pin assembly of claim 1, further comprising a first spring configured to urge the locator pin away from the locating surface.

3. The support pin assembly of claim 2, further comprising a switch pin configured to engage and retract the stopper pin.

4. The support pin assembly of claim 3, wherein the stopper pin includes a latch configured to maintain a position of the stopper pin when the stopper pin is extended relative to the locator pin.

5. The support pin assembly of claim 3, further comprising an actuator disposed relative to the switch pin and configured to retract the stopper pin away from the locator pin.

6. The support pin assembly of claim 1, further comprising a second spring disposed relative to the stopper pin and configured to extend the stopper pin relative to the locator pin.

7. The support pin assembly of claim 6, wherein the stopper pin includes a first end configured to contact the second spring and a second end configured to contact the sleeve member when the stopper pin is extended, and wherein the switch pin engages the stopper pin proximate to the second end of the stopper pin.

8. The support pin assembly of claim 1, further comprising an actuator disposed relative to the stopper pin and configured to selectively extend and retract the stopper pin relative to the locator pin.

9. The support pin assembly of claim 1, wherein the sleeve member and the locator pin form a unitary structure.

10. The support pin assembly of claim 1, further comprising a locking member configured to lock said sleeve member at said predetermined position.

11. The support pin assembly of claim 10, wherein said locking member includes a nut with a threaded bore defined therethrough.

12. A rapidly deployable support pin assembly for locating and supporting a fixture on a tooling plate having a locating surface, the fixture defining at least one pinhole, and the tooling plate defining a plurality of fastening holes at preselected locations of the locating surface, the support pin assembly comprising:
   a stanchion member configured to fixedly secure the support pin assembly to the locating surface of the tooling plate at a predetermined location, the stanchion member defining a substantially cylindrical bore and having a first threaded portion on an inner-diameter surface thereof;
   a substantially cylindrical sleeve member at least partially disposed within the bore, having a second threaded portion on an outer-diameter surface thereof, wherein the second threaded portion is threadably engaged with the first threaded portion such that the sleeve member is configured to telescope with respect to the stanchion member between a first position and a second position;
   a locator pin having a first end and a second opposing end, wherein the locator pin is engaged with the sleeve member at the first end and configured to mate with the fixture at the second end;
   a stopper pin operatively connected to the sleeve member and configured to selectively extend and retract relative to the locator pin;
   a first spring configured to urge the locator pin away from the locating surface and facilitate rapid deployment of the locator pin; and
   wherein the locator pin is free to displace relative to the locating surface when the stopper pin is retracted, and the locator pin is blocked from displacing relative to the locating surface by the stopper pin when the stopper pin is extended.

13. The support pin assembly of claim 12, further comprising a switch pin configured to engage and retract the stopper pin.

14. The support pin assembly of claim 13, wherein the stopper pin includes a latch configured to maintain a position of the stopper pin when the stopper pin is extended relative to the locator pin.

15. The support pin assembly of claim 13, further comprising an actuator disposed relative to the switch pin and configured to retract the stopper pin away from the locator pin.

16. The support pin assembly of claim 12, further comprising a second spring disposed relative to the stopper pin and configured to extend the stopper pin relative to the locator pin.

17. The support pin assembly of claim 16, wherein the stopper pin includes a first end configured to contact the second spring and a second end configured to contact the sleeve member when the stopper pin is extended, and wherein the switch pin engages the stopper pin proximate to the second end of the stopper pin.

18. The support pin assembly of claim 12, further comprising an actuator disposed relative to the stopper pin and configured to selectively extend and retract the stopper pin relative to the locator pin.

19. The support pin assembly of claim 12, wherein the sleeve member and the locator pin form a unitary structure.

20. The support pin assembly of claim 12, further comprising a locking member having a nut with a threaded bore defined therethrough, the locking member being configured to lock the sleeve member in any predetermined position between the first and second positions.

\* \* \* \* \*